United States Patent
Hamilton et al.

(10) Patent No.: US 8,332,877 B2
(45) Date of Patent: Dec. 11, 2012

(54) COORDINATED ACTIONS OF KERNEL AND USERSPACE COMPONENTS

(75) Inventors: Eric Hamilton, Mountain View, CA (US); Toshimitsu Kani, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1322 days.

(21) Appl. No.: 12/022,843

(22) Filed: Jan. 30, 2008

(65) Prior Publication Data
US 2009/0193162 A1 Jul. 30, 2009

(51) Int. Cl.
*G06F 3/00* (2006.01)
*G06F 13/24* (2006.01)

(52) U.S. Cl. .............. 719/328; 710/8; 710/260

(58) Field of Classification Search .......... 719/328; 710/8, 260
See application file for complete search history.

(56) References Cited

U.S. PATENT DOCUMENTS

| | | | | |
|---|---|---|---|---|
| 6,163,829 A * | 12/2000 | Greim et al. | .............. | 710/260 |
| 6,532,535 B1 * | 3/2003 | Maffezzoni et al. | .............. | 713/1 |
| 7,010,638 B2 * | 3/2006 | Deng et al. | .............. | 710/306 |
| 7,269,388 B2 * | 9/2007 | Poursabahian et al. | ...... | 455/41.2 |
| 7,281,076 B2 * | 10/2007 | Yates et al. | .............. | 710/305 |
| 7,308,586 B2 * | 12/2007 | Oshins et al. | .............. | 713/300 |
| 7,343,364 B2 * | 3/2008 | Bram et al. | .............. | 706/47 |
| 7,765,388 B2 * | 7/2010 | Barrett et al. | .............. | 712/244 |
| 2006/0242270 A1 * | 10/2006 | Sankaranarayan et al. | ... | 709/220 |
| 2008/0140895 A1 * | 6/2008 | Baker et al. | .............. | 710/262 |

* cited by examiner

*Primary Examiner* — Charles E Anya

(57) ABSTRACT

A system for and method of coordinating actions of components between userspace and kernel are described. The system comprises a processor; zero or more hardware components coupled with the processor; and a memory coupled with the processor and comprising a set of processor-executable instructions. The instructions comprise a component handling state machine responsive to at least one of a kernel component or a userspace component; and at least one component interface thread in communication with the component handling state machine and configured to interact with at least one of the zero of more hardware components responsive to a signal from the component handling state machine.

21 Claims, 4 Drawing Sheets

COORDINATED ACTIONS OF KERNEL AND USERSPACE COMPONENTS

RELATED APPLICATION

The present application is related to U.S. patent application Ser. No. 11/252,439 titled, "Method and Apparatus for Dynamically Allocating Resources Used by Software" filed on Oct. 17, 2005, the entirety of which is incorporated by reference herein.

BACKGROUND

The inventors are aware of two prior approaches to coordinating actions of kernel components of an operating system and userspace components executing on the operating system. A first approach incorporates all executable instructions within the kernel. Consequently, the kernel instruction set becomes more difficult to write and maintain, more limited in the services which may be used, and defects in the kernel code may be more serious and may panic the system.

A second approach executes complex operations in userspace without the ability of the kernel to recover from failure. Consequently, system reliability is reduced when userspace code fails.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
FIG. 1 is a high-level block diagram of a system according to an embodiment.
Figure 1:
Figure 1:
Figure 1:
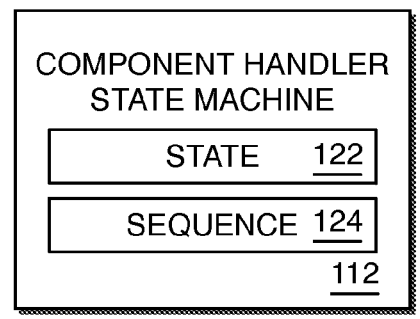
Figure 1:
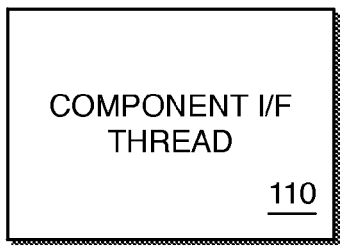
Figure 1:
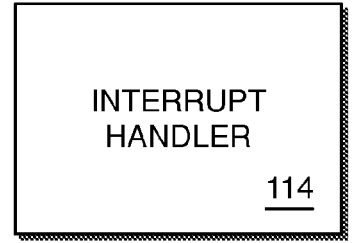
Figure 1:
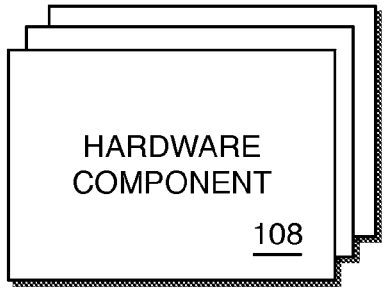

FIG. 1 depicts a high-level block diagram of a system 100 in conjunction with which an embodiment may be operated to advantage. System 100 is a computer or other processor or logic-based system.

System 100 comprises a hardware layer 102, a kernel or operating system (O/S) layer 104 ("kernel"), and a userspace layer 106 ("userspace"). Hardware layer 102 comprises one or more hardware components 108 of system 100, e.g., processor, memory, network interface, input/output (I/O) interface, or a combination of one or more of the preceding, or other physical devices. One or more hardware components 108 may be added and/or removed during operation of system 100. In at least some embodiments, one or more of hardware components 108 may be removed or deactivated during operation of system 100 and without powering down the system.

Kernel layer 104 comprises a set of instructions for controlling operation of system 100 and the interaction of sets of instructions, e.g., programs, with one or more components 108 of hardware layer 102. Kernel layer also comprises a component interface (I/F) thread 110, a component handler state machine (CHSM) 112, an interrupt handler 114, and a kernel layer calling program 116 ("kernel calling program").

Component I/F thread 110 communicates with one or more of hardware components 108 and component handler state machine 112 and coordinates the interaction of the component handler state machine with at least one of the hardware components.

Component handler state machine 112 communicates with sets of instructions, e.g., programs, being executed in userspace 106, e.g., a userspace calling program 118, as well as sets of instructions being executed in kernel 104, e.g., component I/F thread 110, kernel calling program 116, and interrupt handler 114. CHSM 112 coordinates the interaction of userspace calling program 118, kernel calling program 116, and component I/F thread 110 and/or interrupt handler 114 in order to interact with one or more hardware component 108.

CHSM 112 coordinates operations affecting the entire hardware component 108 such as the addition or removal of a hardware component from system 100. In at least some embodiments, the addition or removal of a hardware component 108 may comprise either or both of physical or virtual removal from system 100. CHSM 112 also coordinates operations affecting sub-components of hardware component 108 such as the migration of processes and/or data between processors and/or memory of one or more hardware components and/or sub-components. CHSM 112 also coordinates interactions which modify the number of active processors in one or more hardware components and/or enable or disable particular features of a component or sub-component, e.g., particular processor features.

CHSM 112 stores data corresponding to the number and identity of hardware components 108 which are involved in the operation coordinated by the CHSM. In at least some embodiments, CHSM 112 also stores data corresponding to the number and identity of processors of a hardware component 108 which is involved in the operation coordinated by the CHSM. In at least some embodiments, CHSM 112 also stores data corresponding to the amount and/or identity of memory of a hardware component 108 which is involved in the operation coordinated by the CHSM.

CHSM 112 also stores a state identifier (ID) 122 indicating the state of the CHSM in accordance with the process flow (200 of FIG. 2) in order to coordinate CHSM operations. CHSM 112 also stores a sequence ID 124 identifying a requested operation received from a calling program, i.e., either userspace calling program 118 or kernel calling program 116. In at least some embodiments, sequence indicator 124 is a sequentially incrementing value.

Interrupt handler 114 handles interrupts received by kernel 104 via hardware layer 102 or other kernel layer set of instructions. Interrupt handler 114 transmits received interrupts to CHSM 112.

Userspace 106 comprises one or more sets of instructions, e.g., userspace calling program 118 and authorization service 120, which execute based on support from kernel 104. Userspace calling program 118 comprises a set of instructions which, when executed by a processor, communicate with CHSM 112 of kernel 104. Further, userspace calling program 118 provides an interface for other userspace 106 programs to interact with CHSM 112.

In at least some embodiments, a calling program, i.e., either of userspace calling program 118 or kernel calling program 116, may operate in at least one of a polling ("no-sleep") manner or a notification ("sleep") manner. In a polling manner, the calling program continually monitors the status of CHSM 112 via periodic requests to the CHSM, i.e., the calling program does not sleep after communication of a signal to the CHSM. In a notification manner, the calling program sleeps (suspends execution) after communication of a signal to the CHSM 112 and wakes up or is awakened as a result of receipt of a signal from the CHSM.

In at least some embodiments, authorization service 120 operates to authorize a requested operation received from userspace calling program 118. For example, calling program 118 requests authorization service 120 to check whether one or more preconditions have been satisfied in order that an operation requested by the calling program may proceed to be transmitted to CHSM 112. In at least some embodiments, authorization service 120 comprises the capability to check processor licensing and other factors.

Figure 2:
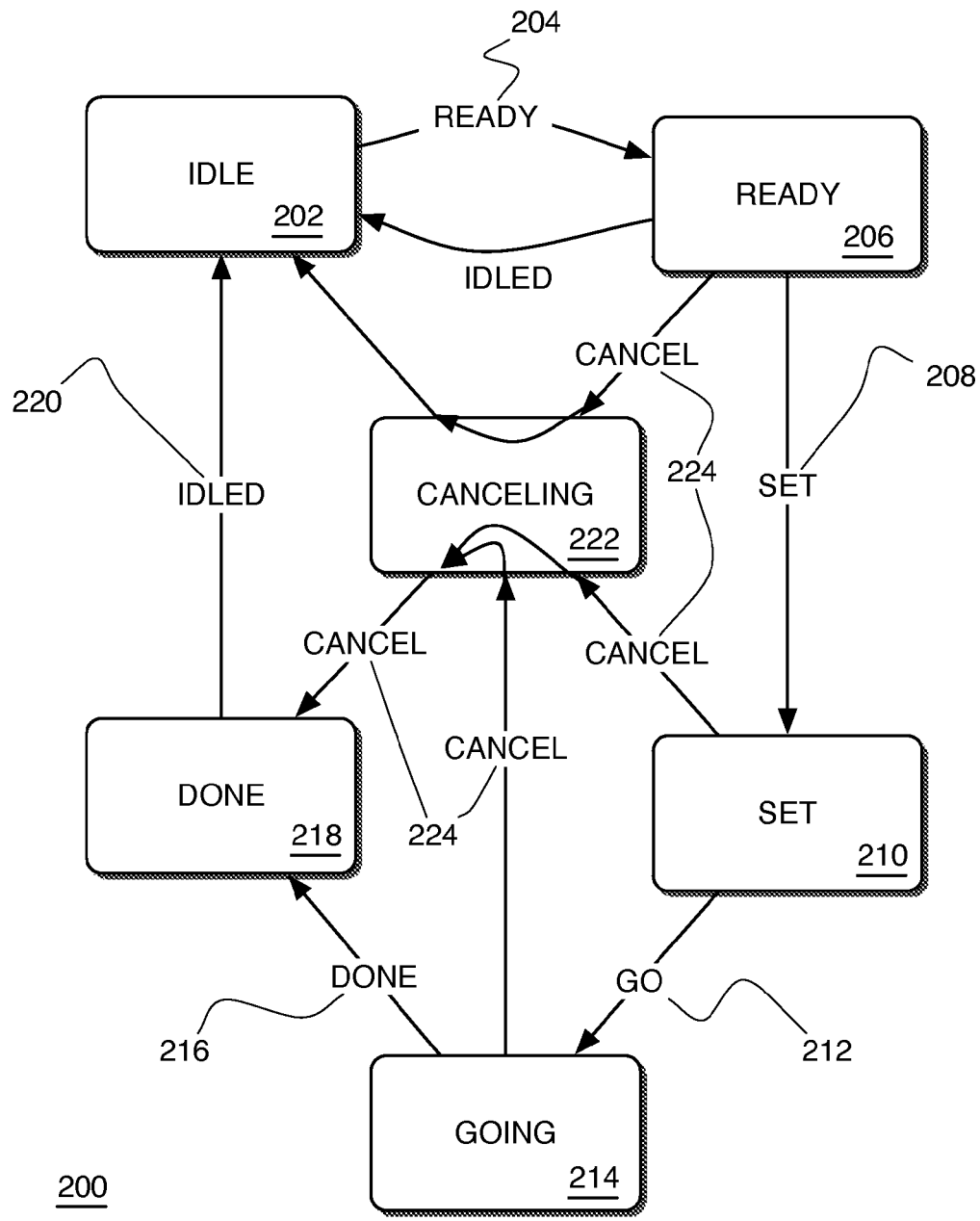
FIG. 2 is a high-level process flow of a method according to an embodiment.

FIG. 2 depicts a high-level process flow 200 of a method according to an embodiment of CHSM 112. CHSM 112 coordinates steps taken by userspace 106 and kernel 104 sets of instructions, i.e., userspace calling program 118 and kernel calling program 116, in order to perform operations on a hardware component 108. CHSM 112 coordination is performed, in at least some embodiments, by the CHSM 112 advancing through process flow 200.

The flow begins with CHSM 112 in an idle state 202. Responsive to receipt of a ready signal 204 from a calling program of userspace 106 or kernel 104, i.e., calling programs 116, 118, the flow proceeds to ready state 206 wherein CHSM 112 begins coordination of interaction with hardware component 108.

In at least some embodiments, ready signal 204 comprises an indication of whether the calling program operates in a polling manner or a notification manner. In at least some embodiments, if the calling program operates in a notification manner and CHSM 112 has already received a ready signal 204, the CHSM queues the later-received ready signal. After execution of the earlier-received ready signal completes, i.e., transition of CHSM 112 to idle state 202, the CHSM begins operation on the later-received ready signal.

In at least some embodiments, responsive to receipt of ready signal 204, CHSM 112 stores sequence ID 124 corresponding to the requested operation. Sequence ID 124 is also returned to the calling program which transmitted ready signal 204. In at least some embodiments, as CHSM 112 transitions from state to state, state ID 122 stored in CHSM 112 is incremented. Accordingly, the stored sequence ID is returned to the calling program which transmitted ready signal 204.

After calling program 116, 118 receives returned sequence ID 124, the calling program may perform one or more precondition checks with respect to the operation to be requested. For example, with respect to userspace calling program 118, the calling program requests authorization service 120 to perform a precondition check. In at least some embodiments, each calling program 116, 118 performs a precondition check prior to transmitting a requested operation to CHSM 112. In at least some embodiments, only userspace calling program 118 requires a precondition check be performed prior to transmission of the requested operation. In at least some embodiments, authorization service 120 authorizes the requested operation based upon resource, e.g., hardware component 108 and/or hardware sub-component, licensing.

If the result of the precondition check is positive, the calling program transmits a set signal 208 to CHSM 112 wherein the set signal comprises the requested operation. Set signal 208 comprises an operation to be performed on hardware component 108 and/or a sub-component of the hardware component. In at least some embodiments, set signal 208 also comprises one or more parameters associated with performance of the requested operation. If the result of the precondition check is negative, the calling program transmits an idled signal 220 to CHSM 112 causing the CHSM to return to idle state 202. In at least some embodiments, after return to idle state 202, CHSM 112 removes, resets, and/or invalidates sequence identifier 124 in preparation for beginning a new requested operation.

Responsive to receipt of a set signal 208 from the calling program, the flow proceeds to set state 210.

Operations and parameters specified as part of set signal 208 comprise one or more of:
addition of a hardware component to system 100 (and an identifier of the added hardware component) and a number of processor sub-components to activate on the added hardware component;
deletion of a hardware component from system 100 (and an identifier of the deleted hardware component);
addition of a sub-component to a hardware component such as a processor or memory (and an identifier of the added sub-component); and
deletion of a sub-component to a hardware component such as a processor or memory (and an identifier of the deleted sub-component).

The above component and sub-component identifiers may also be a number or amount such as a number of processors and/or amount of memory size. In at least some embodiments, the requested non-specific numbers/amounts may be received via a component of kernel 104 for a determination of which specific memory ranges and/or processors to add or delete. For example, in at least some embodiments, kernel 104 determines which memory ranges and/or processors to add or delete based on a dynamic load value of the processors in system 100.

Responsive to receipt of a go signal 212 generated from interrupt handler 114, CHSM 112 performs a validation of the requested operation identified as part of the go signal and the requested operation identified as part of set signal 208. If the operations do not match, the flow proceeds to canceling state 222.

After the parameters are specified with set signal 208, userspace calling program 118 may interact with a hardware component 108 to cause the component to become ready for the operation to be performed. The interaction may be direct or via firmware. In at least some embodiments, the calling program may be kernel calling program 116.

In at least some embodiments, calling program 116, 118 may communicate with a hardware component 108 via a system management interface, e.g., a firmware interface such as a intelligent platform management interface (IPMI). Using the IPMI, calling program 116, 118 initiates a hardware component change and is able to obtain hardware component and/or sub-component information.

Hardware component 108 triggers interrupt handler 114 to indicate that the hardware component is ready to perform the operation. Interrupt handler 114 determines which hardware component is ready and what operation the component is ready to perform. Interrupt handler 114 sends go signal 212 to CHSM 112 passing in the identity of the hardware component 108 that triggered the interrupt handler and the operation the component is ready to perform.

In the event of an error in the userspace calling program or hardware such that the hardware component 108 that triggers the interrupt handler 114 or operation for which the hardware component 108 is ready does not match the parameters specified with set signal 208, the CHSM detects a mismatch and the flow proceeds to canceling state 222.

During canceling state 222, requested operations and changes initiated by calling programs 116, 118 may be removed and/or reversed from system 100. The flow then returns to idle state 202 via done state 218.

If the operations match, i.e., CHSM 112 validates the operation and the flow proceeds to going state 214 wherein CHSM 112 transmits a signal to component I/F thread 110 to cause the I/F thread to perform the specified operation received from the calling program with respect to a hardware component and/or sub-component. Associated parameters specified with the operation are also transmitted to I/F thread 110.

In at least some embodiments, set signal 208 specifies more than a single hardware component 108 or sub-component. In accordance with a particular embodiment, interrupt handler 114 receives an interrupt generated by a single hardware component 108 at a time. Further in accordance with this particular embodiment, interrupt handler 114 generates go signal 212 comprising an identification of a subset of the requested hardware components. Responsive to receipt of go signal 212 comprising the subset identification, CHSM 112 remains in set state 210 pending receipt of additional go signals 212 comprising the remaining identifiers for the requested hardware components.

For example, in accordance with an embodiment, userspace calling program 118 transmits a set signal 208, comprising a requested operation to add a first processor and a second processor to system 100, to CHSM 112 after causing the CHSM to transition to ready state 206. Additionally, calling program 118 requests the addition of the first processor and the second processor via an IPMI. In at least some embodiments, calling program may transmit multiple requests via IPMI regarding the addition of the processors.

Subsequent to addition of the first processor, interrupt handler 114 receives an interrupt signal from the addition of the first processor, e.g., from a hardware component 108 or sub-component thereof indicating the addition of the first processor, and the interrupt handler transmits go signal 212, which identifies the first processor as having been added to system 100, to CHSM 112.

CHSM 112 receives the go signal identifying the addition of the first processor and remains in set state 210 because the requested operation has not completed, i.e., the second processor has not been added. Subsequently, interrupt handler 114 receives an interrupt signal from the addition of the second processor and transmits go signal 212, which identifies the second processor as having been added to system 100, to CHSM 112. CHSM 112 receives go signal 212 identifying the addition of the second processor and transitions to going state 214 because the requested operation has completed. CHSM 112 transmits an event signal to component I/F thread 110 identifying the requested operation and the added first processor and second processor. In response, component I/F thread 110 performs the addition of the first processor and the second processor to system 100, e.g., the component I/F thread updates information about resources of the system to include the newly added first processor and second processor. In at least some embodiments, CHSM 112 transmits the contents of set signal 208 and go signal 212 to component I/F thread 110, e.g., requested operation type and identifiers of components.

In at least some embodiments where requested operations do not require initiating external action and a subsequent interrupt, the calling program causes CHSM 112 to transition from set state 210 to going state 214 by transmitting both set signal 208 and go signal 212 to CHSM. In at least some embodiments, certain operations specified in set signal 208 are disallowed if received from a calling program in userspace 106, e.g., if a subsequent calling program requests an operation having a different sequence ID from the sequence ID of the current operation (i.e., interaction between a calling program and the CHSM), the CHSM does not execute the requested operation from the subsequent calling program.

Responsive to receipt of a done signal 216 generated by component I/F thread 110, the flow proceeds to done state 218 which indicates completion of the requested operation and returns a completion code to the calling program. In at least some embodiments, done signal 216 includes a completion code that indicates whether the operation was successful. In at least some embodiments, if the calling program operates in a polling manner, the calling program determines that CHSM 112 has transitioned to done state 218 via a response generated from the CHSM responsive to such a polling operation. Subsequent to determining that CHSM 112 has transitioned to done state 218, calling program 116, 118 transmits an idled signal 220. In at least some embodiments, completion code forms a part of done signal 216. As described above, the operation is performed by the component I/F thread 110. The kernel portion of the operation is coordinated with either calling program 116 or 118. After the component I/F thread 110 complete the operation, the component I/F thread generates and transmits done signal 216 to CHSM 112. Done signal 216 indicates that the component I/F thread 110 has completed its portion of the operation.

In at least some embodiments, calling program 116, 118 may perform post-operation activities, e.g., causing authorization service 120 to update stored information as a result of the operation requested by the calling program. Subsequent to the post-operation activity, calling program 116, 118 transmits idled signal 220 to CHSM 112.

Responsive to receipt of an idled signal 220, the flow proceeds to return to idle state 202 and await another ready signal from a calling program. Further, CHSM 112 removes, resets, and/or invalidates sequence identifier 124 in preparation for beginning a new requested operation.

If CHSM 112 is in a state other than idle state 202 and done state 218, responsive to receipt of a cancel signal 224, the flow proceeds to canceling state 222 wherein CHSM 112 performs a cancellation of the requested operation. If CHSM is in ready state 206 at the time of receipt of cancel signal 224, after CHSM 112 cancels the requested operation, the flow proceeds to return to idle state 202. If CHSM is in set state 210 or going state 214 at the time of receipt of cancel signal 224, after CHSM 112 cancels the requested operation the flow proceeds from canceling state 222 to done state 218 and CHSM 112 awaits receipt of an idled signal 220. In at least some embodiments, CHSM 112 returns a completion code to the requester that indicates that cancellation has occurred. In at least some embodiments, CHSM 112 transmits an error message in reply to a calling program transmitting a cancel signal 224 if CHSM 112 is in done state 218. The completion code is an indication of whether the operation performed by component I/F thread 110 succeeded, failed, or was cancelled. If the component I/F thread 110 detects an error (e.g. hardware failure), the operation will not succeed. Along with done signal 216, the component I/F thread 110 transmits a completion code that indicates whether the operation succeeded or not. Among the possible values of the completion code are: success, error, and cancelled values.

In at least some embodiments, CHSM 112 compares a sequence value received in conjunction with cancel signal 224 to a sequence value returned to the calling program in response to receipt of the set signal 208. If the cancel signal sequence number differs from the returned sequence value, CHSM 112 does not cancel the current operation. In at least some embodiments, if the sequence numbers differ, CHSM 112 transmits an error in reply to the program requesting cancellation.

If the sequence numbers match, CHSM 112 proceeds to cancel the current operation. In at least some embodiments, if CHSM 112 is in going state 214, the CHSM transmits a cancel signal to component I/F thread 110 to cause the I/F thread to cancel the requested operation. In at least some other embodiments, component I/F thread 110 polls CHSM 112 to determine whether the requested operation is to be cancelled. In at least some of these other embodiments, component I/F thread 110 begins polling of CHSM 112 after the CHSM enters going state 214. If component I/F thread 110 determines/receives a cancel signal, the I/F thread backs out changes related to hardware component 108 and returns an indication of completion to CHSM 112.

In at least some embodiments, if CHSM 112 is in a state other than idle state 202 and receives another ready signal, the CHSM returns a busy signal in response. In at least some embodiments, if CHSM 112 is in a state other than idle state 202 and receives another ready signal, the CHSM does not return a signal in response. In at least some other embodiments, if CHSM 112 is in a state other than idle state 202 and receives another ready signal, the CHSM does not return a signal in response until the flow returns to idle state 202.

Figure 3:
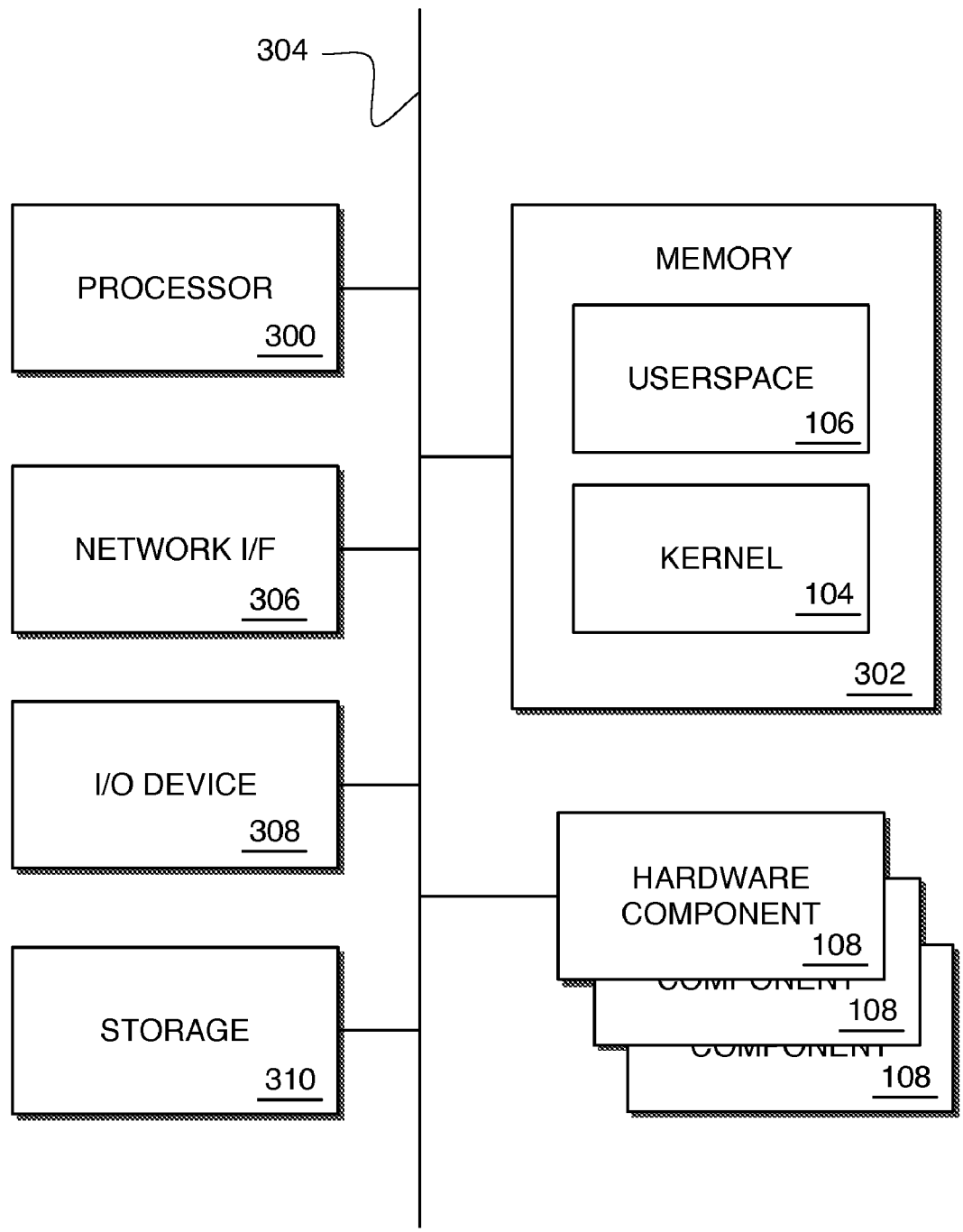
FIG. 3 is a high-level functional block diagram of a system according to an embodiment.

FIG. 3 depicts a high-level functional block diagram of system 100, e.g., a computer system, according to an embodiment. System 100 comprises a processor 300, a memory 302, a network interface (I/F) 306, a storage 310, an input/output device 308, and one or more hardware components 108 communicatively coupled via a bus 304 or other interconnection communication mechanism.

Memory 302 (also referred to as a computer-readable medium) may comprise a random access memory (RAM) or other dynamic storage device, coupled to the bus 304 for storing data and instructions to be executed by processor 300, e.g., kernel 104, userspace 106, portions of the kernel and/or the userspace, and components thereof. Memory 302 also may be used for storing temporary variables or other intermediate information during execution of instructions to be executed by processor 300. Memory 302 may also comprise a read only memory (ROM) or other static storage device coupled to the bus 304 for storing static information and instructions for the processor 300.

Network I/F 306 comprises a mechanism for connecting to another device. In at least some embodiments, system 100 comprises more than a single network interface.

A storage device (storage 310), such as a magnetic disk or optical disk, may also be provided and coupled to the bus 304 for storing data and/or instructions, e.g., kernel 104, userspace 106, etc.

I/O device 308 may comprise an input device, an output device and/or a combined input/output device for enabling user interaction system 100. An input device may comprise, for example, a keyboard, keypad, mouse, trackball, trackpad, and/or cursor direction keys for communicating information and commands to processor 300. An output device may comprise, for example, a display, a printer, a voice synthesizer, etc. for communicating information to a user.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

Figure 4:
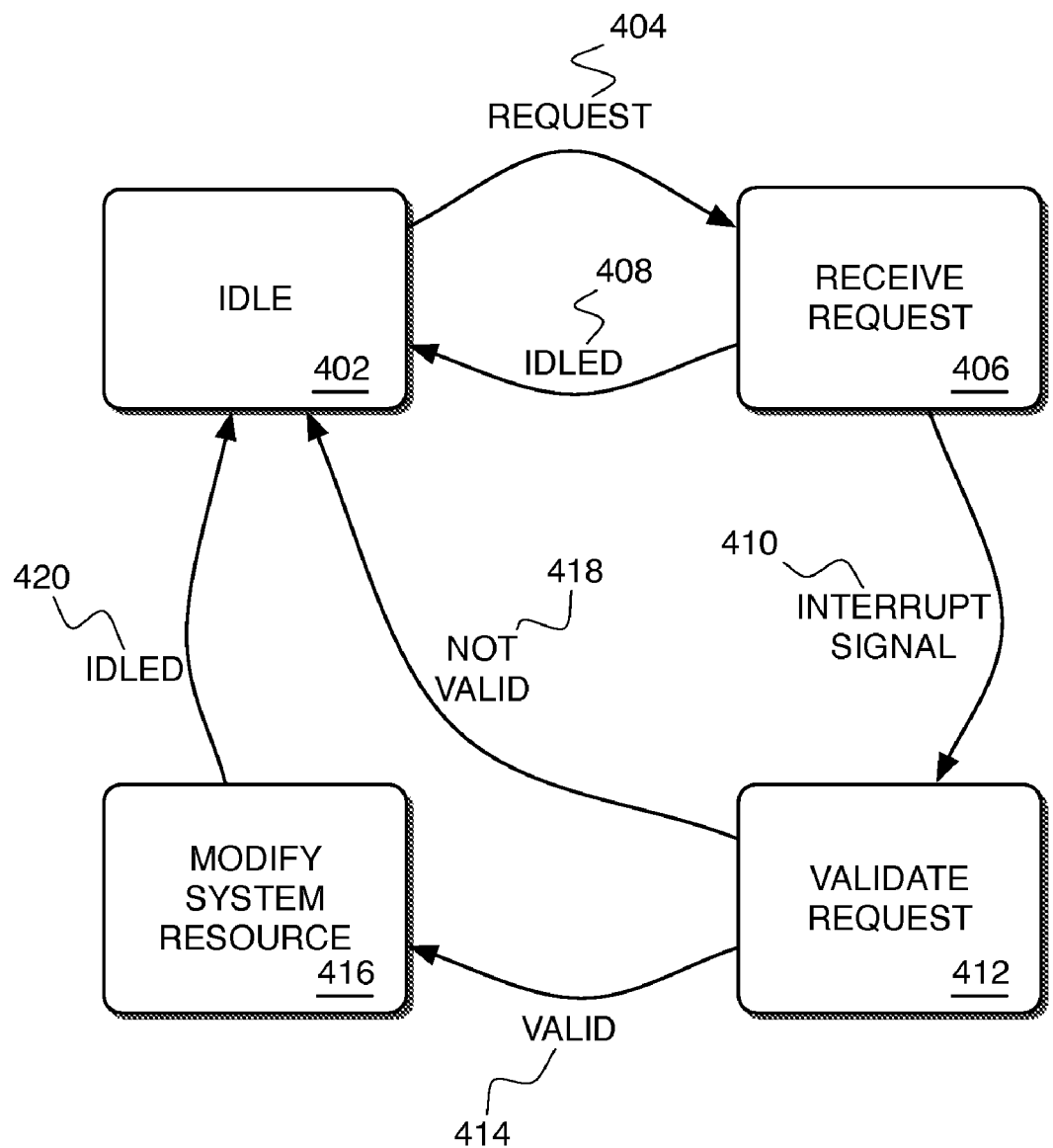
FIG. 4 is a high-level process flow of a method according to another embodiment.

FIG. 4 depicts a high-level process flow 400 of a method according to another embodiment of CHSM 112. The flow begins with CHSM 112 in an idle state 402 and responsive to receipt of a ready signal 404 from a calling program, e.g., calling programs 116, 118, the flow proceeds to receive request state 406.

In at least some embodiments, during receive request state 406, the flow may return to idle state 402 responsive to receipt of an idled signal 408 from the calling program. In at least some embodiments, during receive request state 406, CHSM 112 may receive a set signal similar to set signal 208 (FIG. 2).

Responsive to receipt of an interrupt signal 410 (similar to go signal 212 of FIG. 2) from interrupt handler 114, the flow transitions to a validate request state 412. During validate request state 412, CHSM 112 validates a requested operation identified as part of interrupt signal 410 with the requested operation from the calling program, e.g., as received as part of set signal 208.

If CHSM 112 determines that the requested operation is valid (as indicated by valid transition 414), the flow proceeds to modify system resource state 416. If CHSM 112 determines that the requested operation is not valid (as indicated by not valid transition 418), the flow proceeds to return to idle state 402. In at least some embodiments, if CHSM 112 determines that the requested operation is not valid, the calling program determines that the CHSM has determined that the operation is not valid, e.g., either via a polling mechanism or via a signal transmitted from CHSM 112, and transmits an idled signal to cause the flow to transition from validate request state 412 to idle state 402.

During modify system resource state 416, CHSM 112 causes component I/F thread 110 to perform modify system resources in accordance with the requested operation. In at least some embodiments, responsive to receipt of an indication of completion of the requested operation from component I/F thread 110, the calling program determines that the operation has completed, e.g., either via a polling mechanism or via a signal transmitted from CHSM 112.

Responsive to receipt of an idled signal 420 from the calling program, the flow returns to idle state 402.

In at least some embodiments, one or more hardware components may comprise virtual hardware components in place of physical hardware components. In accordance with the particular embodiment, the virtual hardware component comprises one or more sets of instructions configured to interact with at least interrupt handler 114 and component I/F thread 110 as described above.

What is claimed is:

1. A system for coordinating actions of components between userspace and kernel, comprising:
   a processor;
   zero or more hardware components coupled with the processor; and
   a memory coupled with the processor, the kernel comprising a set of processor executable instructions, wherein the instructions comprise:
      a component handling state machine responsive to at least one of a kernel component or a userspace component, the component handing state machine being a state machine to validate an interrupt handler transmitted signal identifying an operation and hardware component with respect to a requested operation received from a userspace component with respect to one or more hardware components and to update resources of the system based on validation of the interrupt handler transmitted signal; and
      at least one component interface thread in communication with the component handling state machine and configured to interact with at least one of the zero or more hardware components responsive to a signal from the component handling state machine.

2. The system as claimed in claim 1, wherein the component handling state machine transmits a signal identifying at least one hardware component with which the at least one component interface thread interacts.

3. The system as claimed in claim 2, wherein the signal from the component handling state machine comprises a requested operation with respect to at least one hardware component or at least one hardware component sub-component.

4. The system as claimed in claim 3, wherein the requested operation comprises at least one of an add operation, a remove operation, an enable operation, and a disable operation.

5. The system as claimed in claim 1, wherein the requested operation identifies at least one particular hardware component of the one or more hardware components.

6. The system as claimed in claim 1, wherein the requested operation identifies at least one particular sub-component of a hardware component of the one or more hardware components.

7. The system as claimed in claim 1, wherein the component handling state machine is configured to receive a first request from a first requesting component and return a busy indication to a second requesting component responsive to receipt of a second request from the second requesting component, wherein the first requesting component and the second requesting component comprise at least one of the kernel component or the userspace component.

8. The system as claimed in claim 1, wherein the component handling state machine is configured to receive a first request from a first requesting component and queue a second request responsive to receipt of the second request from a second requesting component, wherein the first requesting component and the second requesting component comprise at least one of the kernel component or the userspace component.

9. The system as claimed in claim 1, wherein the component handling state machine is configured to receive a first request from a first requesting component and either return a busy indication to a second requesting component responsive to receipt of a second request from the second requesting component or queue the second request responsive to receipt of the second request from the second requesting component based on the second requesting component type, wherein the first requesting component and the second requesting component comprise at least one of the kernel component or the userspace component.

10. The system as claimed in claim 9, wherein the second requesting component type comprises at least one of a polling type or a notification type.

11. The system as claimed in claim 1, wherein the instructions comprise an authorization service configured to interact with the userspace component to authorize a requested operation transmitted to the component handling state machine.

12. The system as claimed in claim 11, wherein the authorization service is configured to authorize a requested operation based on licensing information with respect to at least one of a hardware component or a hardware component sub-component.

13. The system as claimed in claim 1, wherein the component handling state machine is configured to transmit a sequence identifier to the kernel component or the userspace component responsive to receipt of a signal from the kernel component or the userspace component.

14. The system as claimed in claim 13 wherein the sequence identifier is a unique identifier.

15. The system as claimed in claim 13, wherein the component handling state machine is configured to cancel a requested operation if a comparison of a second sequence identifier of a received cancel request matches the sequence identifier transmitted to the kernel component or the userspace component.

16. The system as claimed in claim 1, wherein the component handling state machine is configured to modify system resources corresponding to more than one hardware component responsive to a single signal from at least one of the kernel component or the userspace component.

17. A method of coordinating actions of components between userspace and kernel, comprising:
    transitioning a state machine to a ready state responsive to receipt of a ready signal from a calling program, wherein the calling program comprises at least one of a userspace calling program or a kernel calling program;
    transitioning the state machine to a set state responsive to receipt of a set signal from the calling program by comparing a sequence number received as part of the set signal with a stored sequence number generated in response to transitioning the state machine to the ready state;
    transitioning the state machine to a going state responsive to validation of the received set signal in comparison with a received go signal initiated by a hardware component configuration modification; and
    transitioning the state machine to a done state responsive to receipt of a done signal from a component interface thread updating a system resource based on the validated set signal.

18. The method as claimed in claim 17, comprising:
    transitioning the state machine to an idle state responsive to receipt of an idled signal from the calling program.

19. The method as claimed in claim 17, comprising: transitioning the state machine to a canceling state responsive to receipt of a cancel signal from the calling program.

20. The method as claimed in claim 17, wherein the transitioning the state machine to the going state is performed after receipt of a corresponding go signal from an interrupt handler for each modified hardware component.

21. The method as claimed in claim 17, wherein the transitioning the state machine to the done state is performed after the component interface thread updates each system resource corresponding to the hardware component configuration modification.

* * * * *

UNITED STATES PATENT AND TRADEMARK OFFICE
CERTIFICATE OF CORRECTION

| | | |
|---|---|---|
| PATENT NO. | : 8,332,877 B2 | Page 1 of 1 |
| APPLICATION NO. | : 12/022843 | |
| DATED | : December 11, 2012 | |
| INVENTOR(S) | : Eric Hamilton et al. | |

It is certified that error appears in the above-identified patent and that said Letters Patent is hereby corrected as shown below:

In the Claims:

In column 8, line 57, in Claim 1, delete "handing" and insert -- handling --, therefor.

Signed and Sealed this
Second Day of April, 2013

Teresa Stanek Rea
*Acting Director of the United States Patent and Trademark Office*